(12) United States Patent
Moscoe et al.

(10) Patent No.: US 12,471,608 B2
(45) Date of Patent: Nov. 18, 2025

(54) PROCESS OF PRODUCING A FOOD ANALOGUE PRECURSOR COMPRISING OF A PLURALITY OF PHASES

(71) Applicant: NEW SCHOOL FOODS INC., Toronto (CA)

(72) Inventors: David Moscoe, Toronto (CA); Auke De Vries, Toronto (CA); Jeffray Behr, Toronto (CA); Christopher Bryson, Toronto (CA); Chris Gregson, Princeton, NJ (US); Rebecca Miller, Toronto (CA)

(73) Assignee: NSTX INDUSTRIES INC., Toronto (CA)

( * ) Notice: Subject to any disclaimer, the term of this patent is extended or adjusted under 35 U.S.C. 154(b) by 0 days.

(21) Appl. No.: 18/351,846

(22) Filed: Jul. 13, 2023

(65) Prior Publication Data
US 2025/0017237 A1    Jan. 16, 2025

(51) Int. Cl.
*A23J 3/22* (2006.01)
*A23D 7/04* (2006.01)
*A23J 3/26* (2006.01)
*A23L 29/256* (2016.01)

(52) U.S. Cl.
CPC .............. *A23J 3/227* (2013.01); *A23D 7/04* (2013.01); *A23J 3/26* (2013.01); *A23L 29/256* (2016.08)

(58) Field of Classification Search
CPC ........... A23J 3/227; A23J 3/26; A23L 29/256; A23D 7/04
See application file for complete search history.

(56) References Cited

U.S. PATENT DOCUMENTS

| | | | |
|---|---|---|---|
| 4,449,906 A | 5/1984 | Sienkiewicz et al. | |
| 6,280,784 B1 | 8/2001 | Yang et al. | |
| 2007/0264415 A1* | 11/2007 | Axelrod | A23K 50/40 |
| | | | 426/623 |
| 2016/0236385 A1* | 8/2016 | Axelrod | B29C 45/1634 |
| 2021/0017319 A1 | 1/2021 | Hong et al. | |
| 2021/0045409 A1 | 2/2021 | Witteveen et al. | |
| 2021/0092978 A1 | 4/2021 | Xu et al. | |
| 2021/0345643 A1 | 11/2021 | Scionti | |
| 2022/0125072 A1 | 4/2022 | Ben-Shitrit et al. | |
| 2022/0330573 A1 | 10/2022 | Zotter et al. | |
| 2023/0225361 A1 | 7/2023 | Nahmias et al. | |

FOREIGN PATENT DOCUMENTS

| | | |
|---|---|---|
| CN | 105394801 A | 3/2016 |
| CN | 211983746 U | 11/2020 |
| CN | 212212666 U | 12/2020 |

(Continued)

OTHER PUBLICATIONS

CN 113907181 Derwent Abstract (Year: 2022).*

(Continued)

*Primary Examiner* — Stephanie A Cox
(74) *Attorney, Agent, or Firm* — NORTON ROSE FULBRIGHT CANADA LLP

(57) ABSTRACT

The present disclosure describes processes of producing a multi-phasic edible gel that resembles the appearance of a whole-cut muscle, such as steak, fish filet and the like. This edible gel is further processed into a plant-based meat or seafood alternative product.

28 Claims, 5 Drawing Sheets

55 °C

50 °C

(56) References Cited

FOREIGN PATENT DOCUMENTS

| | | | |
|---|---|---|---|
| CN | 113875878 A | | 1/2022 |
| CN | 113907181 A | * | 1/2022 |
| CN | 108882806 B | | 2/2022 |
| CN | 115802904 A | | 3/2023 |
| CN | 116172121 A | | 5/2023 |
| CN | 114847396 B | | 6/2023 |
| CN | 114947158 B | | 7/2023 |
| CN | 116420867 A | | 7/2023 |
| EP | 3858148 A1 | | 8/2021 |
| KR | 2323912 B1 | | 11/2021 |
| KR | 2022123637 A | | 9/2022 |
| KR | 2023052793 A | | 4/2023 |
| WO | 2020143109 A1 | | 7/2020 |
| WO | 2020152689 A1 | | 7/2020 |
| WO | 2021007359 A1 | | 1/2021 |
| WO | 2022093122 A1 | | 5/2022 |
| WO | 2022270677 A1 | | 5/2022 |
| WO | 2022162662 A1 | | 8/2022 |
| WO | 2023281512 A1 | | 1/2023 |
| WO | 2023041529 A1 | | 3/2023 |
| WO | 2023063468 A1 | | 4/2023 |
| WO | 2023117233 A1 | | 6/2023 |
| WO | 2023147518 A1 | | 8/2023 |
| WO | 2023147546 A2 | | 8/2023 |

OTHER PUBLICATIONS

Jung Ko et al., "Meat analog production through artificial muscle fiber insertion using coaxial nozzle-assisted three-dimensional food printing". Food Hydrocolloids, Nov. 2021 (Nov. 2021), vol. 120, [online] [retrieved on Dec. 31, 1899 (Dec. 31, 1899)].

* cited by examiner

PROCESS OF PRODUCING A FOOD ANALOGUE PRECURSOR COMPRISING OF A PLURALITY OF PHASES

FIELD

The present disclosure relates to the process for producing a food analogue containing multiple phases.

BACKGROUND

Plant-based substitutes for meat and fish are coming into demand by many consumers who want to make food choices that lower their environmental footprint and limit animal suffering. Consumers with various food allergies to meat or fish, or avoid eating meat for religious reasons also are looking for plant-based alternatives. The growth of the plant-based meat industry is expected to continue for decades to come; the global meat industry would need to grow 69% by 2050 to meet population growth. This will be especially challenging given that animal-based protein is significantly more resource-intensive to produce in terms of water usage, land usage, and greenhouse gas emissions compared to plant-based protein. Moreover, 90% of the planet's wild fish species are already classified as overfished or harvested at maximal capacity. Another impetus for transitioning from animal-based protein to plant-based protein alternatives is being driven by the economic strain and health impact of outbreaks of animal diseases such as Bovine Spongiform Encephalopathy (BSE), swine flu, and bird flu. This means that the opportunity for plant-based foods will only increase over time, driven by mounting pressure from customers, special interest groups, NGOs, and governments. Therefore, from a food security point of view, having a ready alternative to animal-based protein food products is in every countries' best interest.

Unfortunately, it has proven difficult for plant-based meat alternatives on the market today to appeal to the mass market customer because of the difficulties to adequately emulate the taste, texture, nutritional profile, and cooking behavior of real meat. These products sometimes use basic formulations and untailored processes that highlight a lack of R&D investments from the manufacturer. Consumer research has pointed out that consumers rely primarily on 3 criteria when making purchasing decisions for meat vs. alt-meat products: price, taste, and convenience. Thus, if a plant-based meat alternative does not have a comparable taste to real meat, is more expensive, and/or is less convenient to prepare, it will likely only appeal to the niche vegetarian and vegan segments. For plant-based meat analogue products, the majority of options available to the consumer are either comminuted meat products like burgers and sausages, or come in a form of strips or nuggets. As opposed to these processed-meat alternatives, producing a whole-cut meat out of plant-based ingredients is more challenging. Partly this is driven by consumers demanding parity on structure, taste, and cooking performance, which is difficult to achieve when producing whole-cut meat alternatives. One element of achieving such parity lies in the final appearance of the meat-analogue product. Hence, improved processes of producing realistically looking meat-analogue products are needed.

As well within the alternative protein industry, almost all efforts are focused on alternatives that emulate beef, chicken and pork, with little efforts directed to alternative, plant-based seafood. Plant-based seafood accounted for only 1% of total plant-based meat alternative sales in 2019, representing only 0.07% of total seafood sales ($105M). If the plant-based seafood market can reach 10% of the total seafood market in 2030, just as the overall plant-based meat market is projected to hit 10% of global meat sales, it will be worth $20B. As such, improved processes for producing plant-based seafood alternatives are needed.

Gelatin art involves a technique of injecting colorful base gelatin into clear gelatin to form 3D shapes such as petals, leaves and other shapes. However, this technique is limited to the application of liquid gelatin into clear firm gelatin, and only produces simple shapes. The range of edible materials that can be used or created using this technique is highly limited.

US20220330573A1 discloses a bacon analogue made by folding or rolling ingredients into shape. This method is limited in terms of the types of ingredients that can be folded or rolled, as well as limited in terms of the final product shape which must all have the same cross-sectional shape.

WO2022270677A1 discloses a food analogue manufacturing process involving 3D printing to introduce fibrocity in their product. This process involves coaxial extrusion of two layers of an outer layer of protein over an inner layer of hydrocolloid (composed of alginate, glucomannan, and carageenan) using a coaxial nozzle. Since 3D printing is involved, this process can involve complex machinery. As well, this process is limited to the type of material that can be 3D printed as well as the types of nozzles that can be used.

SUMMARY

In one aspect, there is provided a process of manufacturing a meat or seafood analogue comprising a plurality of material phases, the process comprising: i) providing an ingestible fluid or semi-fluid polymer composition configured to gel or viscosify under suitable conditions, said polymer composition forming a first phase; ii) depositing one or more ingestible composition within the first phase via a nozzle while passing the nozzle through the first phase, to form one or more additional phases within the first phase; and iii) subjecting the phases to suitable conditions for gelling or viscosifying one or more of the compositions.

In another aspect, there is provided a meat or seafood analogue manufactured by the process described herein.

In yet another aspect, there is provided a food analogue comprising a plurality of gelled phases, the food analogue comprising: a first phase comprising an ingestible polymer composition; one or more additional phases deposited within the first phase, the one or more additional phases formed from one or more ingestible composition; wherein the phases form a target three-dimensional structure to mimic a meat or seafood product.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF THE DRAWINGS

Embodiments of compositions, processes, methods, apparatus, and kits are described throughout in reference to the drawings.

DETAILED DESCRIPTION

Figure 1A:
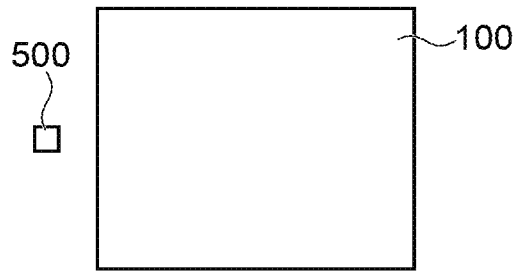
FIG. 1 shows a schematic illustration of a process of introducing a second phase into a first phase. A) A first phase and a nozzle is provided. B) The nozzle passes through the first phase while depositing a second phase. C) After the nozzle passes through, a planar second phase is created within the first phase.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are not to be interpreted to exclude the presence of other features, steps or components. As used herein, the term "exemplary" means "serving as an example, instance, or illustration," and should not be construed as preferred or advantageous over other configurations disclosed herein. As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, "protein" includes natural proteins as well as recombinant proteins. As used herein, the phrase "Protein gel" means a three dimensional viscoelastic network of proteins that immobilizes water. For example, this can be achieved by heating a protein solution above the denaturation temperature of the protein in favourable solvent conditions (e.g., ionic strength and pH) for the formation of a continuous network. Another possible route is to create a fluid suspension or dispersion of proteins or protein aggregates and, via a change in solvent condition (e.g., ionic strength or pH), a protein gel is formed due to the reduction in repulsion between the proteins or protein aggregates. As used herein, "gelling" means the process of creating a gel that has a predominantly elastic, as opposed to viscous, character, for example via cooling of a hydrocolloid solution. In some embodiments, a composition is gelled by introducing suitable conditions (e.g. changing temperature or pH) or introducing agents (e.g. salts). In some embodiments, a composition is gelled passively by allowing the composition to gel over time without the use of a specific trigger. As used herein, "viscosifying" means the process of increasing the viscosity of a composition. In some cases, viscosity of a composition is increased as a result of formation of cross-links, phase changes (i.e. solidifying, crystalizing) and/or increased attractive forces between molecules. In some embodiments, a composition is viscosified by introducing suitable conditions (e.g. changing temperature or pH) or introducing agents (e.g. salts). In some embodiments, a composition is viscosified passively by allowing the composition to viscosify over time without the use of a specific trigger. As used herein, the words "protein denaturing" means altering the structure of a protein from its native state. For example, this can be achieved by breaking some of the intramolecular bonds, for example hydrogen bonds, within a protein molecule. The breaking of these bonds, for example as a result of heat treatment, means that the highly ordered protein structure is altered from its natural or native state. This process may include exposure of hydrophobic side groups, normally buried in the center of the protein molecule as well as shifting or creation of intermolecular disulfide bonds. This may result in the formation of protein aggregates.

Raw meat and fish have a particular and recognizable appearance whereby sections of connective tissue, adipose tissue, and lean muscle can easily be distinguished. Hence, producing a meat or seafood analogue that mimics the structural components of natural meat or seafood is important for consumer adoption and acceptance. Most meat analogues are produced using the process of extrusion. This method uses shear, heat, and pressure to align proteins to produce fibers. Besides essentially pre-cooking the proteins, this technique is limited in its capability when it comes to recreating the appearance and structure of raw meat with distinguishable phases of muscle, fat and connective tissue.

An alternative method to produce meat and seafood analogues is based on the process of directional freezing. For example, a hydrocolloid gel or solution may be frozen unidirectionally to produce a fibrous scaffold. Subsequently, protein can be added to the fibrous scaffold to produce elongated protein fibers. Many hydrocolloids can be used for this purpose, with non-limiting examples being carrageenan, alginate, agar, konjac, gellan, (modified) starches. This process has the advantage of being able to produce a fibrous meat alternative, where the shape and composition can be defined. Exemplary directional freezing processes for manufacturing food analogues are disclosed in WO2022/241576 and U.S. Pat. No. 11,241,024B1, the entire content of which is incorporated herein by reference. Directional freezing introduces elongated ice crystal channels, which are subsequently replaced with protein to produce protein fibers. Although directional freezing allows for creation of fibrous meat or seafood analogues, additional techniques are needed to further introduce the appearance and/or structure of muscle, fat and connective tissues.

Multi-Phasic Products

To produce plant-based meat and seafood analogues with realistic appearances and structures while also being able to incorporate directional freezing techniques to produce fibrous food products, the present inventors have invented a process of manufacturing a meat or seafood analogue with a plurality of material phases. As used herein, a "meat or seafood analogue" or a "food analogue" refers to a product for consumer consumption or an intermediate product that is subsequently subjected to further processing to produce a meat or seafood analogue for consumer consumption. Preferably, the food analogue has structural and/or visual characteristics that mimic the appearance and structure of muscle, fat and connective tissues in natural meat or seafood, such that the structural or visual characteristics are carried on to the final meat or seafood analogue product. This process of manufacturing the food analogue with the structural or visual characteristics is advantageous (for example from a manufacturing perspective) as it allows for the structural and/or visual design of the meat or seafood analogue to be divided from the protein loading process. It also allows for a more natural/realistic looking product relative to the method of stacking or layering different components together. It also allows them to have different cooking profiles, enabling flaking, and the delivery of different flavor release systems. By first providing a food analogue with a desired structural and/or visual characteristics, the subsequent directional freezing and protein loading steps can be separately customized. Alternatively, different food analogues can be provided followed by the same subsequent directional freezing and protein loading steps to yield different products. In some embodiments, the food analogues described herein are subsequently subjected to directional freezing and loaded with proteins. In some embodiments, the food analogues described herein are subjected to additional treatment steps prior to directional freezing. Exemplary treatment steps include, but are not limited to: modifications to optimize directional freezing and/or protein loading; modification to optimize stability and/or consistency; or modifications to further enhance appearance or flavor profile of the meat or seafood analogue.

All materials, compositions, and phases described herein for use in the preparation of meat or seafood analogue food analogues are intended for consumption and therefore ingestible. As used herein, a "phase" or a "material phase" refers to materials that can be physically or chemically distinguished from another material, for example, by appearance, color, texture, viscosity, physical phase, and/or chemical composition. By preparing a food analogue having multiple material phases, the distinctive materials produce structural and/or visual boundaries that allow meat or seafood analogues to mimic muscle, fat, ligaments/tendons/cartilage, extracellular matrix, facia, nerves, and/or connective tissues in natural meat or seafood. In some embodiments, the multiple phases of the food analogue are formed from the same ingestible compositions with differing properties (i.e. density, viscosity, color, flavor, hardness) or different additives (i.e. nutrients, colors, flavoring, tastants, emulsifiers, pH regulators, preservatives) to produce desired structural, sensory, and/or visual characteristics in the final meat or seafood analogue products. In other embodiments, the multiple phases of the food analogue are formed from the different ingestible compositions to produce desired structural, sensory, and/or visual characteristics in the final meat or seafood analogue products. For example, the multiple phases of the food analogue exhibit different appearances (colour, opacity, translucency, etc.), texture, nutrition, flavor, melting or cooking behavior, or any other functional behavior.

In some embodiments, an ingestible fluid or semi-fluid polymer composition is provided as a first phase of the food analogue. As used herein, a "fluid or semi-fluid composition" refers to compositions having sufficient fluid characteristics to allow for another composition to be deposited therewith while maintaining distinctive structural and/or visual characteristics of the two compositions. In preferred embodiments, the fluid or semi-fluid polymer composition is derived from a non-animal source, such as a plant based source. As used herein, "plant-based" ingredients include algae- or seaweed-derived ingredients. In other embodiments, the fluid or semi-fluid polymer composition is derived from an animal or non-animal source, or combination thereof. In some embodiments, the polymer composition is a protein-based polymer composition, a carbohydrate-based polymer composition, or combinations thereof capable of forming a network of crosslinked polymer chains. Interactions between the polymer chains cause cross-linking and results in the formation of a three-dimensional network, entrapping the aqueous liquid into a semi-solid structure. The crosslinks between biopolymers can either be chemical or physical and are comprised of, but not limited to, hydrogen bonds, hydrophobic or ionic interactions, and chain entanglements. These crosslinks are strong enough such that the integrity of the polymer network is preserved and the polymers do not readily dissolve back into solution. The ingestible fluid or semi-fluid polymer composition described herein is configured to gel or viscosity under suitable conditions by forming these cross-linking. Example suitable conditions for gelling or viscosifying include, but are not limited to: heating, introducing a salt, adjusting pH, introducing a crosslinking agent, increasing pressure, irradiation.

Exemplary polymer composition include, but are not limited to: hydrocolloids, polysaccharide hydrogels, gelatin, agar, fermentation derived gelatin, alginate, curdlan, kappa-carrageenan, kappa 2-carrageenan and iota-carrageenan, furcelleran, starch, modified starch, dextrins, konjac glucomannan, pectin, methylcellulose, gellan gum, xanthan gum, guar gum, locust bean gum, gum arabic, and tara gum. The polymer compositions may be naturally occurring, they could be recombinant, or they could be lab-grown or cultivated, or they could be chemically or enzymatically modified. In one embodiment, the ingestible fluid or semi-fluid polymer composition comprises agar-alginate.

Hydrocolloids are widely utilized in the food industry for their diverse functionalities, including gelling, thickening, stabilizing, emulsifying, and water-binding properties. Examples of hydrocolloids include agar, alginate, carrageenan, carboxymethyl cellulose (CMC), cellulose gum, gum arabic, gum ghatti, gum karaya, guar gum, locust bean gum, microcrystalline cellulose (MCC), pectin, sodium carboxymethyl cellulose (NaCMC), tara gum, tragacanth gum, xanthan gum, acacia gum, curdlan gum, chitosan, konjac gum, methyl cellulose, inulin, gellan gum, welan gum, high-ester pectin, low-ester pectin, pullulan, dextrin, beta-glucan, and various modified forms of these hydrocolloids. These hydrocolloids are derived from a variety of sources, such as seaweed, plants, microbial fermentation, and cellulose, and are commonly used in an array of food products, including dairy products, baked goods, sauces, dressings, confectionery, beverages, and meat analogs.

In meat analogs, hydrocolloids can play a crucial role in creating the desired texture and mouthfeel. They can provide binding properties, enhance water retention, and contribute to the formation of a fibrous structure, preventing the product from falling apart during processing or cooking. Additionally, hydrocolloids can improve the juiciness, succulence, and overall sensory attributes of meat analogs, making them a vital ingredient in the formulation of these products.

In some embodiments, the one or more ingestible compositions are then deposited within the first phase to create one or more additional phases. In one embodiment, these one or more ingestible compositions are the same as the fluid or semi-fluid polymer composition. In another embodiment, these one or more ingestible compositions are different from the fluid or semi-fluid polymer composition. In some embodiments, different ingestible compositions are each deposited at different locations within the first phase to create multiple additional phases in the first phase. In other embodiments, the same ingestible compositions are deposited within the first phase at multiple locations to create multiple distinct phases within the first phase.

Figure 1B:
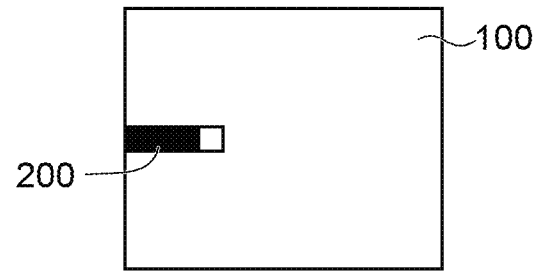
Figure 1C:
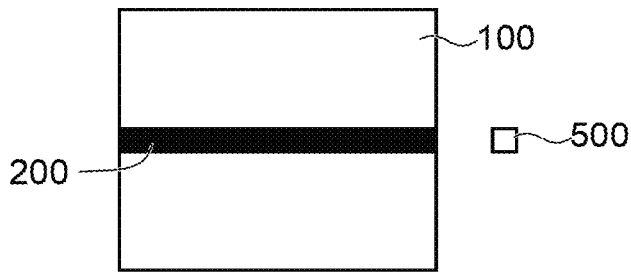
Figure 2A:
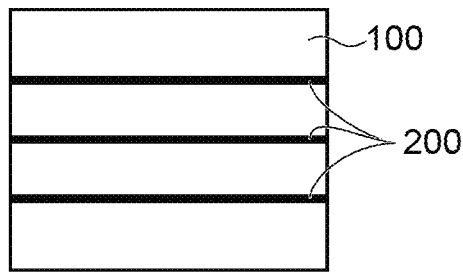
FIG. 2 shows a schematic illustration of various multi-phase shapes. A) Cross sectional view of first phase with multiple straight horizontal sheets of second phase. B) Cross sectional view of first phase with multiple curved sheets of second phase. C) Cross sectional view of first phase with second phase in sheets and dots. D) Perspective view of first phase with multiple straight horizontal sheets of second phase. E) Perspective view of first phase with multiple curved sheets of second phase.
Figure 2B:
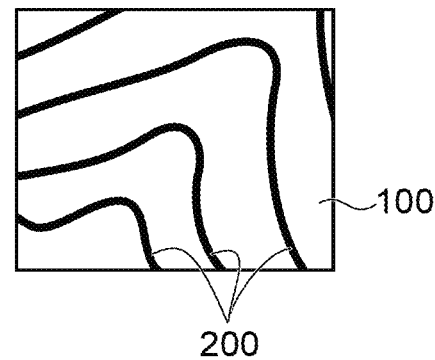
Figure 2C:
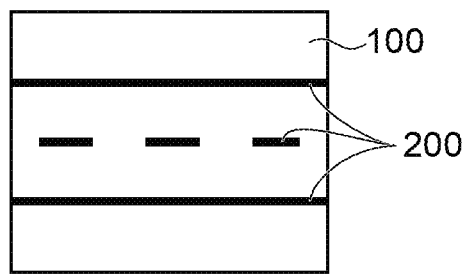
Figure 2D:
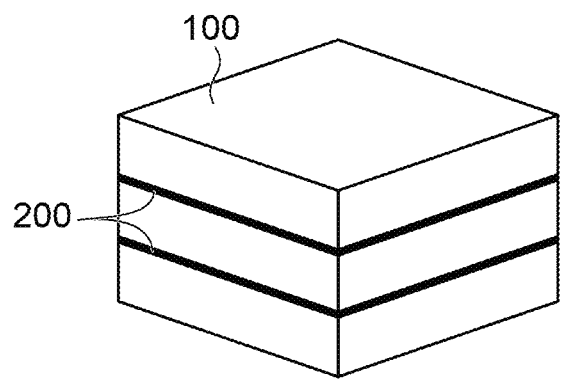
Figure 2E:
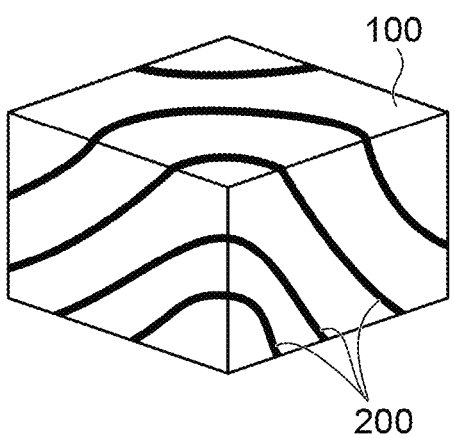

In some embodiments, the one or more ingestible composition is deposited within the first phase via a nozzle. Turning to FIG. 1, passing exemplary nozzle 500 through a first phase 100 deposits a second phase composition 200 behind. In some embodiments, the nozzle is passed through the first phase multiple times to create multiple phases of the ingestible composition within the first phase. In some embodiments, a set of nozzles offset from each other are passed through the first phase to simultaneously deposit multiple phases of the ingestible composition within the first phase. In some embodiments, after depositing the ingestible composition, the food analogue is gelled or viscosified, or at least sufficiently gelled or viscosified to lock the phases in place.

Nozzle Injection for Depositing Additional Phases

Nozzles are commonly utilized in various food production applications, including extrusion, decorating, filling, coating, and piping. For instance, nozzles are employed in extrusion processes to shape dough or batter into specific forms, such as pasta or cookies. They are also used in decorating food products, such as cakes or confections, to create intricate designs or patterns. Dispensing nozzles are instrumental in filling food products with fillings, applying coatings, and piping decorative shapes or lines of food materials. The present inventors have discovered that the precision and versatility of nozzles make them a particularly useful tool in the production of meat and seafood analogues, enabling the creation of unique appearances, textures, shapes, and flavors. In some embodiments, a nozzle is operated by a robotic arm for precision and reproducibility at large scale manufacturing. The nozzle may be attached to the robotic arm, or manipulated by a robotic arm.

In some embodiments, the nozzle has one or more nozzle openings for depositing the one or more ingestible composition. In some embodiments, the nozzle openings have a profile shape selected to deposit the one or more ingestible compositions in a desired shape within the first phase. The same nozzle can also be used to further deposit the one or more ingestible compositions adjacent to the first phase, for example to create a layer of the one or more ingestible composition in contact with or adjacent to the first phase. For example to create a layer adjacent to the first phase, or a perimeter layer around the first phase. In one embodiment, a nozzle opening has an elongated profile for depositing the one or more ingestible composition along a plane within the first phase. In one embodiment, a nozzle opening has an elongated profile shape with width to height ratio of 2:1 or greater. In some embodiments, the nozzle opening has a curved, straight or irregular elongated shape opening to produce various shapes of the one or more ingestible compositions within the first phase. The one or more ingestible composition may be deposited from the nozzle in a continuous or discontinuous manner. In one embodiment, the deposited one or more ingestible composition formed a thin membrane within the first phase. In one embodiment, the thin membrane has regular or irregular thickness, depending on the rate at which the one or more ingestible composition is deposited by the nozzle as it passes through the first phase. In one embodiment, an array of different nozzles is used with different openings to increase the thickness. In one embodiment, depositing speed is varied to increase the thickness. In one embodiment, both an array of different nozzles is used with different openings, and depositing speed is varied to increase the thickness. Where an array of nozzle is used, the thickness of the deposited phase can be varied per line, or within a line. In some embodiments, the shape of the deposited one or more ingestible composition forms a line, a plane, a dot, a non-uniform shape, or a combination thereof within the first phase. Exemplary shapes are shown in FIG. 2. In some embodiments, the nozzle is passed through the first phase in a linear or non-linear path to create various shapes of the one or more ingestible composition in the first phase. In some embodiments, a combination of nozzles with different nozzle opening shapes are used. The variety of available nozzles combined with a variety of ingestible composition options and a multitude of paths the nozzle may be passed through the first phase, allows for an infinite number of design options to closely mimic structure and/or appearance of natural meat or seafood. This includes creating a multi-phasic food analogue having complex shapes and a variety of ingestible compositions that is not possible with traditional rolling/folding methods or with 3D printing.

The nozzles described herein are configured to deposit the one or more ingestible composition through the first phase in a lamellar manner, rather than turbulent. For example, density, viscosity, or dispensing rate of the one or more ingestible composition may be modified, or the shape of the nozzle may be modified to maintain a low Reynold's number when passing through the first phase. In one embodiment, the one or more ingestible composition kept at a temperature prior to deposition to maintain a fluid or semi fluid state. In one embodiment, the one or more ingestible composition is deposited at a temperature that maintains a fluid or semi fluid state. In one embodiment, the temperature is room temperature of 20-25 degree Celsius. In one embodiment, room temperature is about 20, about 21, about 22, about 23, about 24, or about 25 degree celsius. Maintaining fluid or semi fluid state of the one or more ingestible composition allows for subsequent deposition under lamellar conditions. At the same time, the polymer composition and the one or more ingestible composition have sufficient viscosity to suspend the one or more additional phases within the first phase prior to gelling. Ideally, the temperature and/or the consistency of the one or more ingestible composition is selected such that the additional phases remain intact within the first phase, with minimal spread or bleeding out.

The nozzle shape is also designed to reduce turbulent flow when depositing the one or more ingestible composition through the first phase such that the lines are deposited in a reproducible pattern. Changing the speed of injection of the one or more ingestible composition through the nozzle also creates different patterns, and also avoids pooling or creating clumps in the first phase. In some embodiments, the nozzle is passed through the first phase at constant speed such that the resulting additional phases created by depositing the one or more ingestible composition have even thickness. In other embodiments, the nozzle is passed through the first phase at varying speeds to produce different thickness of the resulting additional phases created by depositing the one or more ingestible composition. In one embodiment, the nozzle passes through the first phase at 0.1 mm/sec, 0.5 mm/sec, 1 mm/sec, 2 mm/sec, 5 mm/sec, 10 mm/sec, 20 mm/sec or 50 mm/sec. In one embodiment, the nozzle passes through the first phase at varying speeds.

In some embodiments, multiple nozzles pass through the first phase at same or different speeds. In some embodiments, multiple nozzles pass through the first phase taking the same or different paths. In some embodiments, multiple nozzles pass through the first phase, each with same or different nozzle opening shapes. Each of the multiple nozzles may be separately controlled, each taking its own path or speed through the first phase. For example, the multiple nozzles may be separately controlled by each having its own actuator system. In some embodiments, the multiple nozzles may each have the same or different pump rate. For example, the multiple nozzles may be connected to one or more pump systems for separate control of pump rate. In some embodiments, the multiple nozzles may have combinations of speed, path, nozzle opening, and/or pump rate in order to create different shapes and patterns within the first phase. The pump flow rate and/or translational speed of the nozzle can be independently regulated in order to change and vary the thickness of the plane of the additional phases.

Ingestible Compositions

The depositing of one or more ingestible composition in the first phase creates a multi-phasic food analogue, where the one or more ingestible composition is selected based on target structural, sensory, and/or visual characteristics in the final meat or seafood analogue product. In some embodiments, the one or more ingestible composition comprises a lipid-rich composition and/or a protein-rich composition having or comprising at least one hydrocolloid or protein (such as an amino-acid based polymer composition, or a protein gel) capable of gelling under suitable conditions. As used herein a "protein-rich" or "lipid-rich" composition refer to compositions having majority protein or lipid content, or at least 5%, at least 10%, at least 20%, at least 30%, at least 40%, at least 50%, at least 60%, at least 70%, at least 80%, or at least 90% protein or lipid content. In one embodiment, the one or more additional phases comprise a lipid-rich composition of emulsified fat and/or oil. In one embodiment, the one or more additional phases comprise a hydrocolloid. In one embodiment, the one or more additional phases comprise a protein gel. In one embodiment, multiple additional phases are created within the first phase by depositing various different ingestible compositions, including combinations of lipid-rich compositions, hydrocolloids, and protein gels.

Emulsions are colloidal systems consisting of immiscible liquids, such as oil and water, stabilized by an emulsifying agent. They are commonly used in the food industry for their ability to create stable mixtures of ingredients that would otherwise separate. Emulsions are important in the formulation of many food products, as they can improve texture, mouthfeel, flavor release, and overall sensory appeal. In the food industry, emulsions are widely utilized in a variety of applications. For example, salad dressings, mayonnaise, sauces, and margarine are all examples of food products that rely on emulsions for their smooth texture and consistent appearance. Emulsions are also used in dairy products and their plant-based counterparts to create a desirable texture and stability in yogurts and ice cream. In baked goods, emulsions can be used to improve the quality of dough and batter, allowing for better mixing and distribution of ingredients. In the meat and meat analog industry, emulsions are used to prevent fat separation during processing and storage, as well as to achieve succulence and fat release during consumption.

Exemplary emulsions include, but are not limited to, any one or combination of omega-3, omega-6, omega-9 fatty acids. With regard to omega-3 supplements, preferred modes would use omega 3 fatty acids predominantly in the form of fatty acid esters such as, but not limited to, triglycerides.

Additives

In some embodiments, the multi-phased meat or seafood analogue food analogue is supplemented with one or more ingestible additives. In some embodiments, one or more of the phases is supplemented with one or more ingestible additives. Exemplary ingestible additives include, but are not limited to, nutrients, colourants, flavoring, tastants, enzymes, emulsifiers, pH regulators, and/or preservatives.

Examples of ingestible additives include nutrients such as water-soluble vitamins including ascorbic acid (vitamin C), thiamin, riboflavin, niacin, vitamin Be (pyridoxine, pyridoxal, and pyridoxamine), folacin, vitamin B12, biotin, and pantothenic acid. Water insoluble vitamins may also be included, including any one or combination of vitamins A, D, E and K. Ingestible minerals may be included, including anyone or combination of iron, magnesium, manganese, zinc and calcium. Other ingestible supplements include anti-oxidants, such as, but not limited to, tocopherols, vitamins (such as vitamin C, E, and A), carotenoids (including beta-carotene, lycopene, and lutein), flavonoids (such as anthocyanins, quercetin, and catechins), polyphenols (including catechin, resveratrol and ellagic acid), minerals (such as selenium, zinc, and manganese), and other antioxidants like glutathione and coenzyme Q10.

Other ingestible additives include crosslinking agents. Crosslinking agents may include enzymes, ions, chemicals, or chemical precursors that have the ability to induce gelation in one or more phases under suitable conditions. Examples of crosslinking enzymes include but are not limited to as transferases (such as transglutaminase), hydrolases, or oxidoreductases. Other examples of ingestible additives include poly-carboxylic acids used for the purpose of crosslinking polymers such as citric acid, lactic acid, malic acid. Other ingestible polymer crosslinking agents include genipin, procyanidins, tannic acids, nordihydroguaiaretic acid, glutaraldehyde, phosphorous oxychloride, sodium trimetaphosphate, or epichlorohydrin. Further examples of ingestible additives include chemical precursors such as maillard reaction precursors.

Colourants comprises carotenoids, beta-carotene, astaxanthin, lycopene, bixin, anthocyanins, betalain, hemoglobin, myoglobin, beet juice extract, safflower yellow, lutein, curcumin, capsanthin, capsorubin, norbixin, anthocyanins, curcuminoids, turmeric, phycocyanins, melanoidins, or combinations thereof.

Examples of tastants include, but are not limited to, salts and spices. Examples of flavoring include, but are not limited to, aromatic compounds and flavor compounds. Examples of enzymes include, but are not limited to, antioxidants.

Phase Adhesion, Gelling, and Subsequent Processing

Once the phases are positioned as desired, gelling the food analogue sets the phases into place. In some embodiments, additional modifications to the phases are introduced prior to gelling by passing one or more rods, needles or wires through the phases to further modify the shape of the phases. In some embodiments, the step of gelling involves adhesion between the phases. Adhesion between the phases is achieved by selecting ingestible compositions that form intermolecular bonds between adjacent phases. For example, ingestible compositions between phases form hydrogen bonds, hydrophobic or hydrophilic interactions, and/or cross-links that contribute to adhesion during gelling. In some embodiments, induction of gelling also induces adhesion of the phases. Example conditions for inducing adhesion include, but are not limited to: heating, introducing a salt, adjusting pH, introducing a crosslinking agent, increasing pressure, irradiation. In one embodiment, the ingestible compositions are selected that at lower temperatures (such as room temperature) the phases adheres to each other, while at higher temperatures (such as a cooking temperature of greater than 50, greater than 60, greater than 70, greater than 80, greater than 90, or greater than 100 degree celsius) the phases dissociate due to loss of the intermolecular bonds between adjacent phases. This dissociation produces a flaking effect in the final analogue food product, and is a particularly important feature of seafood analogues to mimic natural seafood texture.

Following gelling, the food analogue is subjected to directional freezing and loading with proteins, preferably plant-based protein. Exemplary processes for directional freezing and protein loading are disclosed in WO2022/241576 and U.S. Pat. No. 11,241,024B1, the entire content of which is incorporated herein by reference.

In some embodiments, the gelled food analogue is subdivided into smaller pieces prior to directional freezing. In such cases, a multi-phase food analogue is prepared with a macro design. After subdividing, each piece will retain at least a portion of the multi-phases such that the smaller subdivided pieces mimic pieces of natural meat or seafood.

Alternative Processes

In alternative embodiments, a multi-phased meat or seafood analogue food analogue is produced by extrusion. A pre-shaped die having a plurality of separate channels each loaded with an ingestible polymer composition, and one or more openings through which the ingestible polymer compositions are extruded. The pre-shaped die has several channels that allow multiple compositions to be ejected from the die simultaneously without mixing said compositions prior to exiting the die. For example, each channel may be loaded with a different composition for extrusion. In some embodiments, the different compositions are extruded at different temperatures. In some embodiments, the different compositions are extruded at different speeds. As the ingestible polymer composition is extruded through the channels, they are extruded through the one or more opening. In some embodiments, each channel has a corresponding opening. In other embodiments, one or more openings share a channel. Extrusion of the ingestible polymer compositions results in a plurality of phases of the compositions in layers. In some embodiments, the pre-shaped die is configured with an actuator to create waves in the extruded product. These phases are then gelled to form the food analogue. In some embodiments, gelling the plurality of ingestible polymer composition induces adherence between the phases. Adherence is temperature dependent. Increasing the temperature to a cooking temperature results in separation of the phases.

In another alternative embodiment, one or more of the additional phases are pre-formed into gelled or solidified sheets (i.e. frozen sheets). These sheets are inserted into a first phase made of ungelled ingestible fluid or semi-fluid polymer composition. Once inserted, the polymer composition is gelled to form the food analogue. In one embodiment, the gelled sheets comprise a hydrocolloid and an oil.

Figure 6:
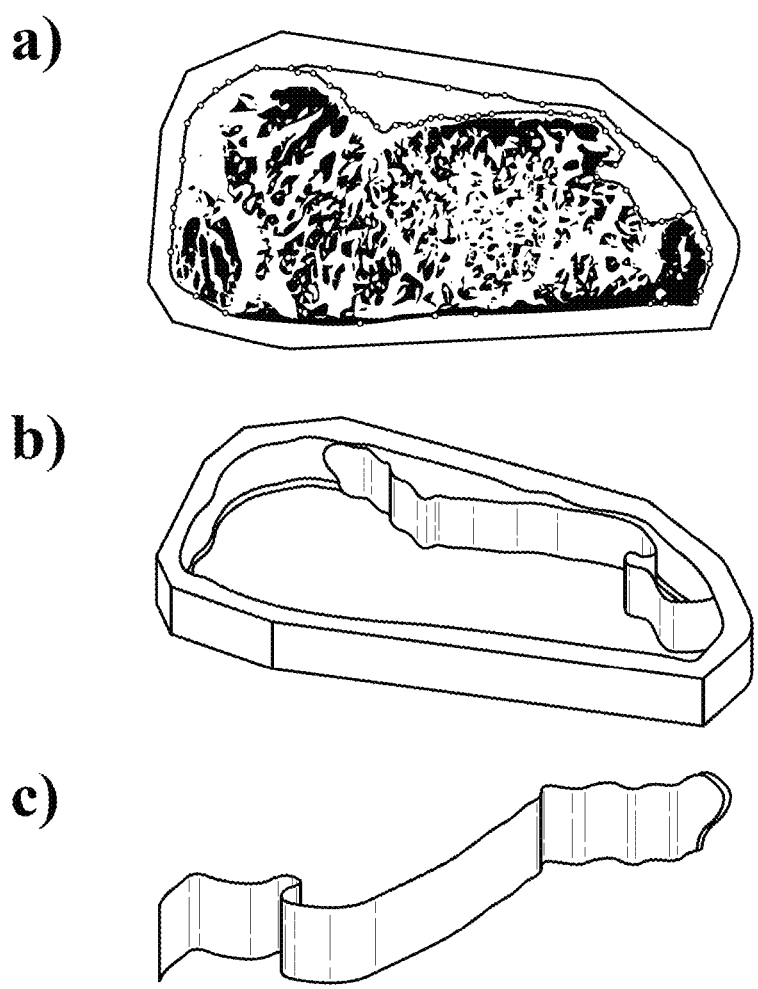
FIG. 6 shows a mold for manufacturing a food analogue. A) Mold design source. B) Isometric view of mold with divider. C) Divider for mold.

In yet other embodiments, one or more layers are further added to the meat or seafood analogue described herein. The one or more layers are made from an ingestible composition that is the same or different from the ingestible composition from the multi-phasic meat or seafood analogue described herein. In some embodiments, the one or more layers comprise an adjacent layer in contact with the meat or seafood analogue described herein having multiple phases, for example, a top layer or a bottom layer. In one embodiment, the one or more layers is a perimeter layer, or a partial perimeter layer, preferably mimicking fat tissues of a piece of meat. The one or more layers can be separately formed and attached or stacked to multi-phasic meat or seafood analogue described herein. The one or more layers can alternatively be created by placing the meat or seafood analogue described herein into a mold and pouring in one or more ingestible compositions into the mold to create the one or more layers. In some embodiments, the mold has one or more dividers for dividing the mold into multiple compartments. A different ingestible composition can be poured into each of the multiple compartments. For example, a mold having a single divider has two compartments: a first compartment for receiving the meat or seafood analogue described herein, and a second compartment for pouring in a lipid-rich ingestible composition to mimic a layer of fat (see FIG. 6 mold design). The dividers are removed before or after the ingestible compositions in the multiple compartments have gelled or viscosified. In one embodiment, the divider is removed prior to gelling of the ingestible composition, and is subsequently cooled to gel and adhere the ingestible compositions together. As well, the one or more layers can be added by depositing one or more ingestible compositions adjacent to the first phase using the nozzle described herein.

EXAMPLES

One aqueous polymer phase was mixed with another, distinctly different phase, to obtain a mixed phase gel that mimics the appearance of a raw, whole cut meat or fish. Existing ways of combining two or more phases into a single product are limited, and therefore the present inventors have developed improved processes of creating a multi-phase product. In the case of cold-set hydrocolloids, the incorporation of the second phase into the first phase may occur at a temperature above the gelling temperature of the hydrocolloid. Upon cooling, the hydrocolloids in both phases gel binding the two phases together via interactions between the hydrocolloids in the two phases. The effectiveness of this process is determined by i) the adhesion between the two phases; ii) the lack of sedimentation or creaming of the second phase after incorporation into the first phase and; iii) the second phase forms well defined lines or shapes, with clear boundary layers.

Example 1: Temperature of the First Phase

Figure 3:
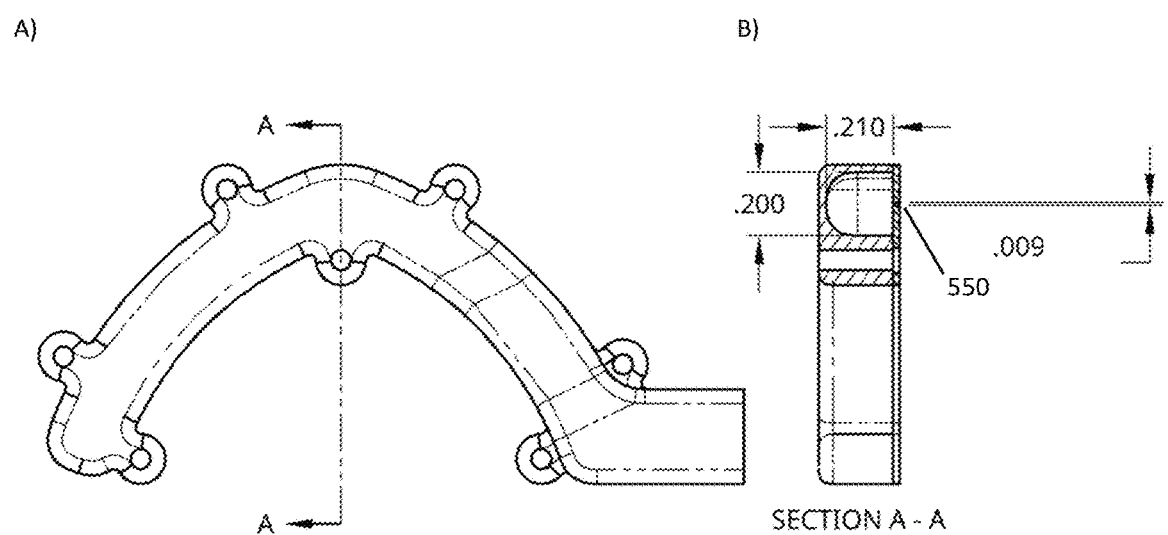
FIG. 3 shows a curved nozzle: A) front view; and B) cross sectional view along A-A. Indicated distances are in inches.

In this example, two phases were used. The first phase contained a hydrocolloid mixture, the second phase is an oil-in-water emulsion, containing a hydrocolloid which was deposited into the first phase. Specifically, the first phase consisted of a hydrocolloid mixture of agar at 2.5 wt % and alginate at 0.5 wt %, which were fully hydrated and dissolved at higher temperatures (>85° C.). The second phase consisted of 2.5 wt % agar, 0.5% tween80 (polysorbate emulsifier) and 30 wt % canola oil. Agar was mixed and dissolved at high temperature, after which the oil was added and homogenized using a rotor-stator emulsifier to generate a stable oil-in-water emulsion. The average oil droplet size of this emulsion was about 5 μm. The first phase was deposited in a rectangular mold and the temperature was then lowered to 50, 47, or 44° C. At these temperatures, the hydrocolloid mixture is still in a semi-liquid state, though the viscosity increases upon lowering the temperature. Upon reaching the target temperature, a curved nozzle (see FIG. 3) with slit opening 550 was passed through the first phase along the length of the mold, depositing the second phase through a slit.

Figure 4:
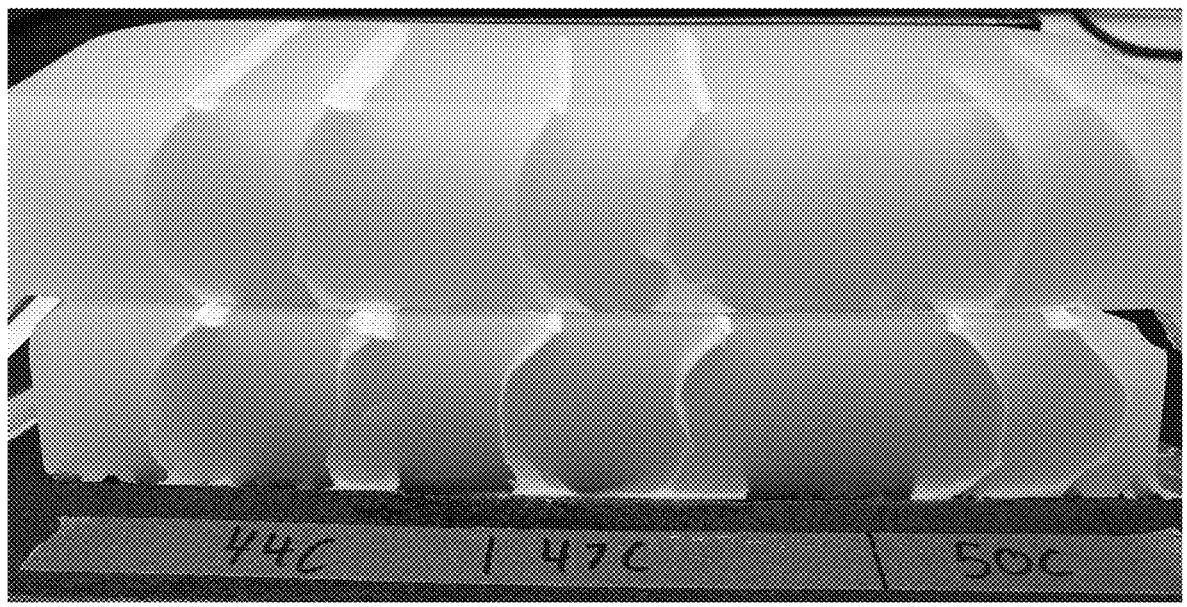
FIG. 4 shows a food analogue block having two phases, with the second phase deposited at 44° C., 47° C., or 50° C.
Figure 5:
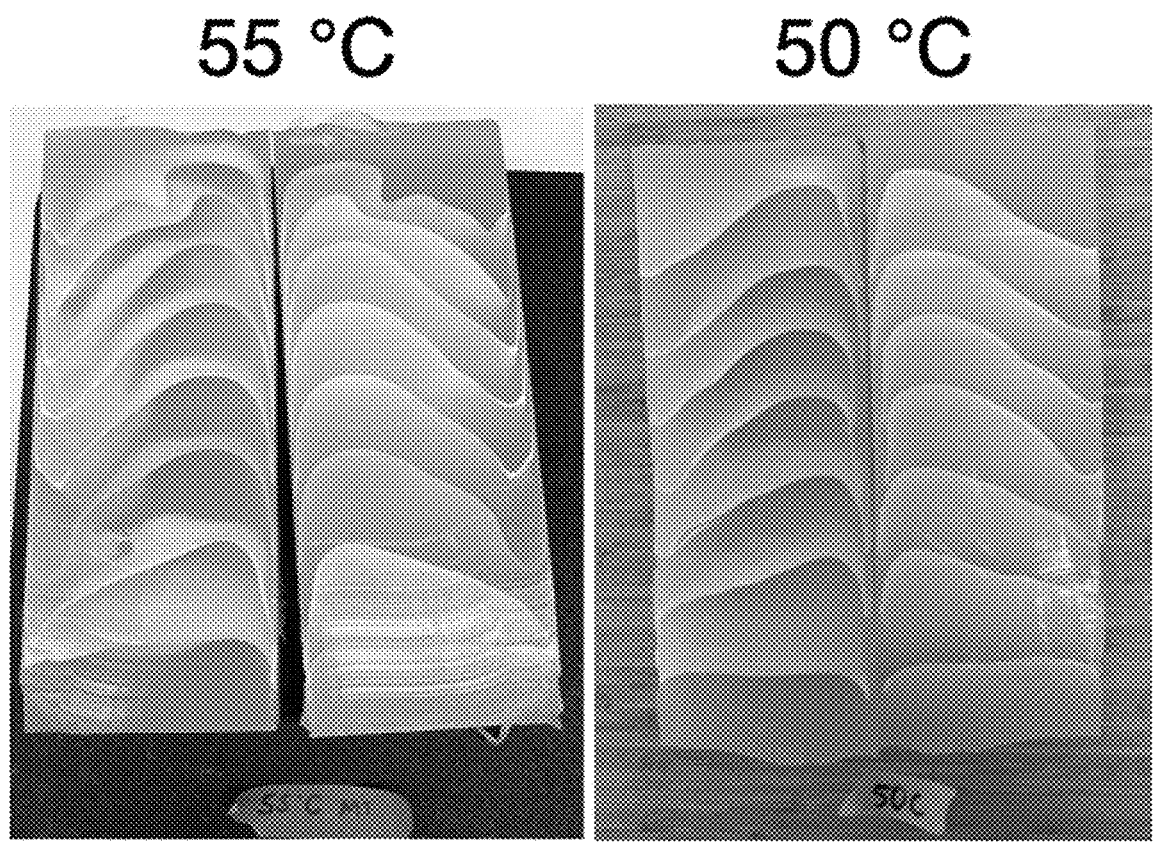
FIG. 5 shows a food analogue block having two phases, with the second phase deposited at 55° C., or 50° C.

The temperature of the second phase is 65° C. while it was deposited into the first phase. After two passes of a speed of, the temperature was lowered to the next target temperature. Ideally, the second phase is deposited in a fashion that leaves a smooth cross sectional appearance similar to the nozzle. Shown in FIGS. 4 and 5 are smooth lines of the deposited phase at 50° C., but a more disrupted appearance at 47 or 44° C., 55° C.

dissolved at high temperature (>85° C.), after which the oil was added and homogenized using a rotor-stator emulsifier to generate a stable oil-in-water emulsion. The average oil droplet size of this emulsion was about 5 µm. The first phase was deposited in a rectangular mold and the temperature was then lowered to 50° C. The second phase was then deposited into the first phase by pumping the second phase through the nozzle at a temperature of 65° C. It was found that the smallest nozzle, with an inner diameter of 0.126 inches did not yield satisfactory results, as the viscosity of the second phase was likely too high for this small diameter nozzle. Larger inner diameter nozzles all performed satisfactorily at a slot length of 3 inches. At a slot length of 6 inches, only the largest inner diameter nozzle had satisfactory results. For these longer nozzle designs, a larger cross-sectional area to slot width is necessary to allow for the second phase to be deposited along the entire length of the nozzle.

TABLE 1

Summary of nozzle dimension

| Slot Width (in) | Needle OD (in) | Needle OD (mm) | Needle Wall Thickness (in) | Needle ID (in) | Cross Sectional Area (in2) | Cross Sectional Area (2) | Ratio of Cross Sectional Area:Slot Width (in) |
|---|---|---|---|---|---|---|---|
| 0.009 | 0.156 | 3.9624 | 0.015 | 0.126 | 0.0125 | 8.04 | 1.39 |
| 0.009 | 0.156 | 3.9624 | 0.01 | 0.136 | 0.0145 | 9.37 | 1.61 |
| 0.009 | 0.156 | 3.9624 | 0.005 | 0.146 | 0.0167 | 10.80 | 1.86 |
| 0.009 | 0.188 | 4.7752 | 0.01 | 0.168 | 0.0222 | 14.30 | 2.46 |
| 0.009 | 0.219 | 5.5626 | 0.01 | 0.199 | 0.0311 | 20.07 | 3.46 |

The ingestible compositions have an elastic modulus, viscosity, and density allow for one phase to be immobilized and entrapped within the first phase with clear boundaries layers indicative of laminar flow. These parameters, being concentration-, temperature-, and shear-dependent, must be tuned for the viscoelastic properties of each composition. Each composition should also be compatible with each other such that after the compositions are deposited they adhere to one another once as the phases are gelled. In some embodiments, ingestible compositions are selected or modified based on elastic modulus, viscosity, and density allow.

Example 2: Length and Inner Diameter of the Nozzle

The dimensions of the nozzle used to deposit the second phase have an effect on generating uninterrupted planes of the deposited second phase with a smooth appearance. In this example, several nozzle designs were used, all based on a thin, stainless steel tube (see Table 1). In this tube, a slot was made of either 3 or 6 inches tall, 0.009 inches wide. The inner diameter of the nozzles varied between 0.126 and 0.199 inches, giving a cross sectional area ranging from 0.01-0.03 square inches. The objective is to generate smooth ribbons of second phase of 3 inches or 6 inches long by pumping the second phase through the slot in the nozzle, thus creating ribbons of deposited phase into the first phase. The first phase contained a hydrocolloid mixture, the second phase is an oil-in-water emulsion, containing a hydrocolloid which was deposited into the first phase. Specifically, the first phase consisted of a hydrocolloid mixture of agar at 2.5 wt % and alginate at 0.5 wt %, which were fully hydrated and dissolved at higher temperatures (>85° C.). The second phase consisted of 2.5 wt % agar, 0.5% tween80 (polysorbate emulsifier) and 30 wt % canola oil. Agar was mixed and

EMBODIMENTS

A. A process of manufacturing a meat or seafood analogue comprising a plurality of material phases with a die having a plurality of separate channels and openings, the process comprising:
  i) simultaneously extruding a plurality of ingestible polymer compositions each through a different channel of the die, to form a plurality of phases of the compositions;
  ii) subjecting the phases to a suitable condition for gelling the plurality of ingestible polymer compositions.

B. The process of embodiment A, wherein gelling the plurality of ingestible polymer composition comprises inducing adherence between the phases, and wherein the phases dissociate at a cooking temperature.

C. A process of manufacture of a meat or seafood analogue comprising a plurality of material phases, the process comprising:
  i) forming solidified sheets of a hydrocolloid and an oil; and
  ii) inserting the sheets into a first phase comprising ingestible fluid or semi-fluid polymer composition configured to gel or viscosify under suitable conditions;
  ii) gelling the polymer composition.

D A process of manufacturing a meat or seafood analogue further comprising adding one or more layers to the meat or seafood analogue described herein.

E The process of embodiment D, wherein the one or more additional layer comprise an adjacent layer, a top layer, a bottom layer, a perimeter layer, or a partial perimeter layer.

F The process of embodiment D, comprising placing the meat or seafood analogue described herein into a mold and pouring in one or more ingestible compositions into the mold to create the one or more layers.

G The process of embodiment D, wherein adding the one or more layers comprise depositing one or more ingestible compositions adjacent to the first phase using the nozzle described herein.

Although the embodiments have been described in detail, it should be understood that various changes, substitutions and alterations can be made herein. Moreover, the scope of the present application is not intended to be limited to the particular embodiments or examples described in the specification. As can be understood, the examples described above and illustrated are intended to be exemplary only. For example, the present invention contemplates that any of the features shown in any of the embodiments described herein, may be incorporated with any of the features shown in any of the other embodiments described herein, and still fall within the scope of the present invention.

The invention claimed is:

1. A process of manufacturing a meat or seafood analogue comprising a plurality of material phases, the process comprising:
   i) providing an ingestible fluid or semi-fluid polymer composition to form a continuous and fluid or semi-fluid first phase, wherein the composition is capable of gelling or viscosifying under suitable conditions;
   ii) after forming the first phase and while the first phase is still fluid or semi-fluid, inserting one or more additional ingestible fluid or semi-fluid composition into the continuous and fluid or semi-fluid first phase via a nozzle while passing the nozzle through the continuous and fluid or semi-fluid first phase along a predetermined path within said continuous and fluid or semi-fluid first phase, to form one or more additional phases suspended within the first phase, wherein the first phase and the one or more additional phases together form a continuous and fluid or semi-fluid unit, wherein along at least a portion of the predetermined path the nozzle deposits the one or more additional ingestible fluid or semi-fluid composition while concurrently passing the nozzle through the first phase, wherein the one or more additional phases form a target three-dimensional structure within the first phase, wherein said target three-dimensional structure corresponds to the predetermined path of the nozzle, and wherein the one or more additional phases has different melting point or denaturation temperature than the first phase; and
   iii) after insertion, subjecting the continuous and fluid or semi-fluid unit to a suitable condition for gelling or viscosifying the continuous and fluid or semi-fluid unit.

2. The process of claim 1, comprising repeating step ii) to further insert the one or more additional ingestible composition at a plurality of locations within or adjacent to the continuous and fluid or semi-fluid first phase, and wherein the continuous and fluid or semi-fluid unit comprises the first phase and a plurality of said additional phases.

3. The process of claim 1, wherein step ii) comprises inserting the one or more additional ingestible composition via a plurality of said nozzles offset from each other, while passing through the continuous and fluid or semi-fluid first phase, thereby inserting the one or more additional ingestible composition at a plurality of locations within the first phase, and wherein the continuous and fluid or semi-fluid unit comprises the first phase and a plurality of said additional phases.

4. The process of claim 3, wherein the plurality of nozzles have one or more different nozzle opening shapes.

5. The process of claim 1, wherein the nozzle has one or more nozzle openings for depositing the one or more additional ingestible composition, and wherein the one or more nozzle opening has:
   a) an elongated shape for inserting the one or more additional ingestible composition along a plane within the continuous and fluid or semi-fluid first phase; or
   b) a curved, straight or irregular elongated shape.

6. The process of claim 1,
   wherein the inserted one or more additional ingestible composition forms a line, a plane, a dot, or a non-uniform shape within the first phase; and/or
   wherein the nozzle is passed through the continuous and fluid or semi-fluid first phase in a linear or non-linear path.

7. The process of claim 1, comprising passing the nozzle through the continuous and fluid or semi-fluid first phase at a constant speed or with a constant flow rate of the one or more additional ingestible composition to form the one or more additional phases with even thickness, or at varying speed or with a varying flow rate of the one or more additional ingestible composition to form the one or more additional phases with varying thickness.

8. The process of claim 1, wherein the one or more additional ingestible composition is inserted:
   a) at a temperature that maintains the one or more additional ingestible composition in a fluid or semi-fluid state; and/or
   b) under a laminar condition.

9. The process of claim 1, wherein the polymer composition and/or the one or more additional ingestible composition have sufficient viscosity to suspend the one or more additional phases within the first phase prior to step iii).

10. The process of claim 1, wherein the target three-dimensional structure a) mimics adipose or connective tissue of a meat product, b) mimics myocommata of a seafood product, or c) mimics ligaments, tendons, fat tissues, facia, extracellular matrix, cartilage, or nerves.

11. The process of claim 1,
    wherein the phases have further different visual appearance, texture, flavor, and/or nutritional content; and/or
    wherein the one or more additional phases have a different color and/or opacity than the first phase.

12. The process of claim 1, wherein the ingestible fluid or semi-fluid polymer composition and/or the one or more additional ingestible composition comprises a lipid-rich composition and/or a protein-rich composition having at least one hydrocolloid or protein capable of gelling under suitable conditions.

13. The process of claim 12, wherein the lipid-rich composition comprises emulsified fat and/or oil.

14. The process of claim 12, wherein one or more of the phases are supplemented with one or more ingestible additives comprising nutrients, colourants, flavoring, tastants, chelating agents, emulsifiers, enzymes, pH modifiers, texture modifiers, preservatives, or combinations thereof.

15. The process of claim 1, comprising prior to step iii) passing one or more rods, needles or wires through the phases to further modify the shape of the phases.

16. The process of claim 1, wherein gelling in step iii) comprises inducing adherence between the phases, wherein adherence between the phases is temperature dependent, and wherein the phases dissociate at a cooking temperature.

17. The process of claim 1, comprising dividing the food analogue into one or more parts before or after step iii), each part comprising at least a portion of the one or more additional phases.

18. The process of claim 1, further subjecting the food analogue to directional freezing and protein loading.

19. The process of claim 1, wherein the nozzle is operated by a robotic arm.

20. The process of claim 1,
wherein the nozzle has a nozzle opening,
wherein passing the nozzle through the continuous and fluid or semi-fluid first phase comprises inserting the nozzle opening into the continuous and fluid or semi-fluid first phase from a first end, translating the nozzle opening across a width of the first phase, and exiting the nozzle opening from a second end of the first phase, and
wherein the nozzle deposits the one or more additional fluid or semi-fluid ingestible composition while the nozzle opening is translated across the continuous and fluid or semi-fluid first phase, thereby forming the one or more additional phases suspended within the first phase.

21. The process of claim 1, wherein the continuous and fluid or semi-fluid first phase is partially gelled or viscosified prior to ii) when inserting the one or more additional ingestible fluid or semi-fluid composition into the first phase.

22. The process of claim 1,
wherein the nozzle has an angled or curved elongated nozzle opening, and
wherein the nozzle is passed through the continuous and fluid or semi-fluid first phase in a linear path, such that the one or more additional phases form the target three-dimensional structure within the first phase.

23. A meat or seafood analogue manufactured by the process of claim 1.

24. The meat or seafood analogue of claim 23, wherein the one or more additional ingestible fluid or semi-fluid composition comprises a hydrocolloid and/or a protein gel.

25. The meat or seafood analogue of claim 23, wherein the one or more additional ingestible fluid or semi-fluid composition comprises a lipid-rich composition and/or a protein-rich composition, and wherein the lipid-rich composition comprises emulsified fat and/or oil.

26. The meat or seafood analogue of claim 23, wherein one or more of the phases are supplemented with one or more ingestible additives comprising nutrients, colourants, flavoring, tastants, chelating agents, enzymes, emulsifiers, pH modifiers, texture modifiers, preservatives, or combinations thereof.

27. The meat or seafood analogue of claim 23,
wherein the phases have different denaturation temperature, or melting point; and/or
wherein the one or more additional phases: i) have a different color and/or opacity than the first phase; or ii) is opaque, white or off-white.

28. The meat or seafood analogue of claim 23, wherein the phases are adhered to each other, and wherein the phases dissociate from each other at a cooking temperature.

* * * * *